United States Patent
Ukai et al.

[11] Patent Number: 5,989,496
[45] Date of Patent: Nov. 23, 1999

[54] WASTE PLASTIC DISPOSAL APPARATUS

[75] Inventors: Kunihiro Ukai; Takeshi Tomizawa, both of Ikoma; Tatsuo Fujita, Osaka; Jiro Suzuki, Nara; Mitsuyuki Nakazono, Fukuoka; Tomotaka Hattori, Kasuga, all of Japan

[73] Assignee: Matsushita Electric Industrial Co., Ltd., Osaka, Japan

[21] Appl. No.: 08/981,962

[22] PCT Filed: May 8, 1997

[86] PCT No.: PCT/JP97/01547

§ 371 Date: Jan. 12, 1998

§ 102(e) Date: Jan. 12, 1998

[87] PCT Pub. No.: WO97/43099

PCT Pub. Date: Nov. 20, 1997

[30] Foreign Application Priority Data

May 13, 1996  [JP]  Japan .................................. 8-117223

[51] Int. Cl.$^6$ ........................................ A61L 11/00
[52] U.S. Cl. ................... 422/3; 422/4; 422/5; 422/108; 422/109; 422/122; 422/307; 422/125; 241/DIG. 38; 96/222
[58] Field of Search ................ 422/3, 4, 5, 108, 422/109, 120, 122, 307, 309, 125; 241/DIG. 38; 96/222

[56] References Cited

U.S. PATENT DOCUMENTS

| | | | |
|---|---|---|---|
| 4,983,214 | 1/1991 | Bottinelli et al. | 75/387 |
| 5,322,603 | 6/1994 | Kameda et al. | 204/158.2 |
| 5,334,313 | 8/1994 | Anderson | 210/624 |
| 5,447,017 | 9/1995 | Becher et al. | 53/527 |

FOREIGN PATENT DOCUMENTS

| | | |
|---|---|---|
| 524 608 | 1/1993 | European Pat. Off. . |
| 734 845 | 10/1996 | European Pat. Off. . |
| 2-35982 | 2/1990 | Japan . |
| 3-26514 | 2/1991 | Japan . |
| 3-49908 | 3/1991 | Japan . |
| 4-284206 | 10/1992 | Japan . |
| 4-122690 | 11/1992 | Japan . |
| 6-47365 | 2/1994 | Japan . |
| 6-184351 | 7/1994 | Japan . |
| 7-124946 | 5/1995 | Japan . |
| 7-137035 | 5/1995 | Japan . |
| 7-164442 | 6/1995 | Japan . |
| 7-205148 | 8/1995 | Japan . |
| 7-227847 | 8/1995 | Japan . |
| 7-227848 | 8/1995 | Japan . |
| 7-276361 | 10/1995 | Japan . |
| 7-276363 | 10/1995 | Japan . |
| 7-304039 | 11/1995 | Japan . |

*Primary Examiner*—Terrence R. Till
*Assistant Examiner*—Fariborz Moazzam
*Attorney, Agent, or Firm*—Wenderoth, Lind, & Ponack, L.L.P

[57] ABSTRACT

A waste plastic disposal apparatus (K1–K4) including a storage portion (2) for storing waste plastic; a heating portion (7) for heating the waste plastic, which includes a heater (7b) and a fan (7a); a hot-air circulating path (20) for circulating hot air therethrough, which is defined by the storage portion (2) and the heating portion (7); an exhaust path (10) which branches off from the hot-air circulating path (20); and a deodorizing portion (9) which is provided in the exhaust path in response to intake of a predetermined quantity of external air into the hot-air circulating path (20) per unit time, the hot air in the hot-air circulating path (20) is exhausted in a quantity equal to the predetermined quantity from the exhaust path (10) through the deodorizing portion (9).

16 Claims, 6 Drawing Sheets

WASTE PLASTIC DISPOSAL APPARATUS

TECHNICAL FIELD

The present invention relates to a waste plastic disposal apparatus for reducing the volume of plastic waste such as plastic wrapping materials, plastic packing materials, plastic containers or the like produced in small-scale firms, stores, etc.

BACKGROUND ART

Plastic is widely used for one-way applications for food wrapping materials, containers, packing materials, etc. but is actually discarded as refuse in a large quantity. Thus, in Japan, a law on recycling of wrapping and containers was recently enacted from a standpoint of reduction of quantity of refuse, saving of energy and saving of resources and obligates recycling of such plastic. In order to promote recycling of plastic, not only legal regulation but economic approach is vital. As one trial, it is proposed to lower the cost of recycled plastic through reduction of transportation and collection costs by reducing volume of plastic with a mechanical crushing and cutting machine, a mechanical compressive apparatus, a mechanical crushing and frictional heat dissolving apparatus, etc. However, these prior art apparatuses have large disposal capacities but are large and expensive and therefore, are not suitable for use in terminal collection spots such as supermarkets where a relatively small quantity of plastic is disposed of.

On the other hand, a method suitable for disposal of a relatively small quantity of plastic, in which plastic is heated at low temperatures so as to be reduced in volume, is proposed in Japanese Patent Laid-Open Publication No. 5-23655 or Japanese Patent Laid-Open Publication No. 5-92179. This method simplifies structure of the apparatuses as compared with conventional ones and is suitable for a compact apparatus for distributed disposal of a small quantity. However, in this known method, since plastic is heated so as to be reduced in volume, malodorous gas may be produced according to the kinds of plastic or heating temperature during the heating process and thus, malodor may be produced from the apparatus during and after disposal. Especially, in case where the disposal apparatus is used in stores such as supermarkets, production of malodorous gas could offer a serious problem. Furthermore, in this known method, in case plastic has been heated at an excessively high temperature due to malfunction of control of the apparatus or combustible volatiles such as kerosine are mixed into the apparatus, there is a risk in that a large quantity of combustible gas is produced and reaches its ignition point.

Therefore, in conventional disposal of waste plastic, there have been such problems that technology for removing malodor quickly and effectively should be established and ignition of produced gas should be prevented under any condition.

SUMMARY OF THE INVENTION

The present invention has for its object to provide, with a view to eliminating the above described disadvantages of conventional waste plastic disposal apparatuses, a compact and inexpensive waste plastic disposal apparatus in which production of malodor at the time of heating of waste plastic is prevented, production of combustible gas during improper operation is restrained and ignition of produced gas is prevented and which is suitable for small-scale firms, stores and household.

In order to accomplish this object, a waste plastic disposal apparatus of the present invention comprises: a storage portion for storing waste plastic, which includes a lid; a heating portion for heating the waste plastic, which includes a heater and a fan; a hot-air circulating path for circulating hot air therethrough, which is defined by the storage portion and the heating portion; an exhaust path which branches off from the hot-air circulating path; and a deodorizing portion which is provided in the exhaust path; wherein in response to intake of a predetermined quantity of external air into the hot-air circulating path per unit time, the hot air in the hot-air circulating path is exhausted in a quantity equal to the predetermined quantity from the exhaust path through the deodorizing portion.

It is desirable that the external air in a volume not less than 20% of a volume of the hot-air circulating path is carried into the hot-air circulating path per minute.

In accordance with the present invention, since quantity of gas produced at the time of heating of waste plastic is reduced, the produced gas is deodorized and risk of ignition of the produced gas is obviated, such a remarkable effect is gained that volume of waste plastic can be reduced safely and effectively at small-scale firms, etc.

DETAILED DESCRIPTION OF THE INVENTION

Hereinafter, embodiments of the present invention are described with reference to the drawings.

(First embodiment)

Figure 1:
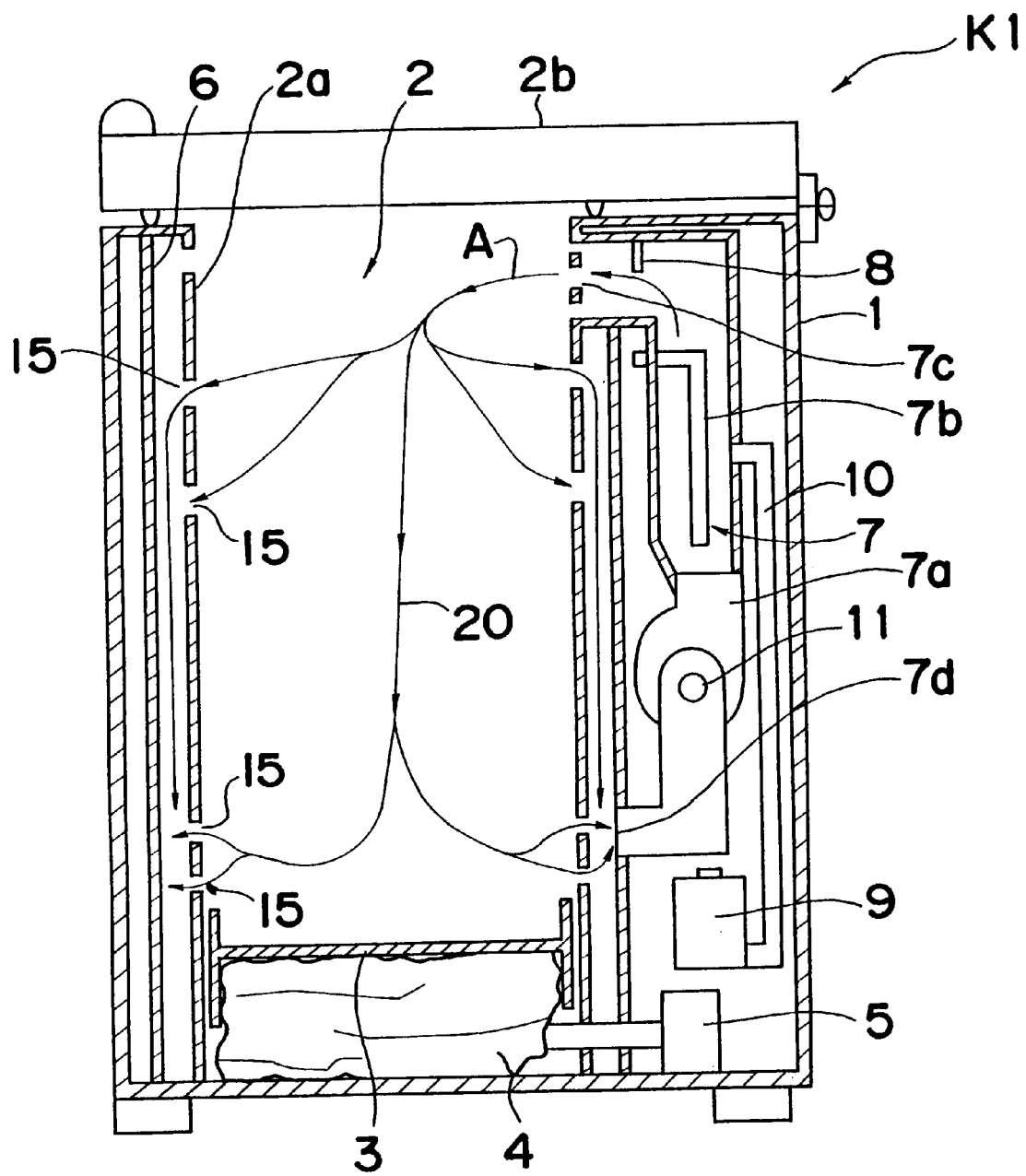
FIG. 1 is a fragmentary longitudinal sectional view of a waste plastic disposal apparatus according to a first embodiment of the present invention.

FIG. 1 shows a waste plastic disposal apparatus K1 according to a first embodiment of the present invention. The waste plastic disposal apparatus K1 includes an apparatus housing 1 and a storage portion 2 for storing waste plastic. The storage portion 2 includes a storage container 2a for storing waste plastic and a lid 2b provided at an upper portion of the storage container 2a. A vertically movable bottom plate 3 is provided in the storage container 2a so as to press waste plastic, while a stretchable and hermetic bag 4 is provided under the bottom plate 3 and is coupled with an air pump 5. Meanwhile, a heat insulating vessel 6 is provided between the apparatus housing 1 and the storage container 2a.

The waste plastic disposal apparatus K1 further includes a heating portion 7 for heating waste plastic. The heating portion 7 is constituted by a pressure sirocco type fan 7a, a heater 7b, a hot-air inlet 7c provided at an upper portion of a side wall of the storage container 2a and a suction port 7d for sucking hot air, which is provided at a lower portion of the heating insulating vessel 6.

In addition, the waste plastic disposal apparatus K1 includes a temperature sensor 8 for detecting temperature of hot air blown from the hot-air inlet 7c into the storage container 2a, a catalytic deodorizing portion 9, a hot-air circulating path 20 for circulating hot air, which is defined by the storage portion 2 and the heating portion 7, an exhaust path 10 which branches off from the hot-air circulating path 20 and leads to the catalytic deodorizing portion 9 and an external air intake 11 provided at a suction port of the fan 7a.

Figure 2:
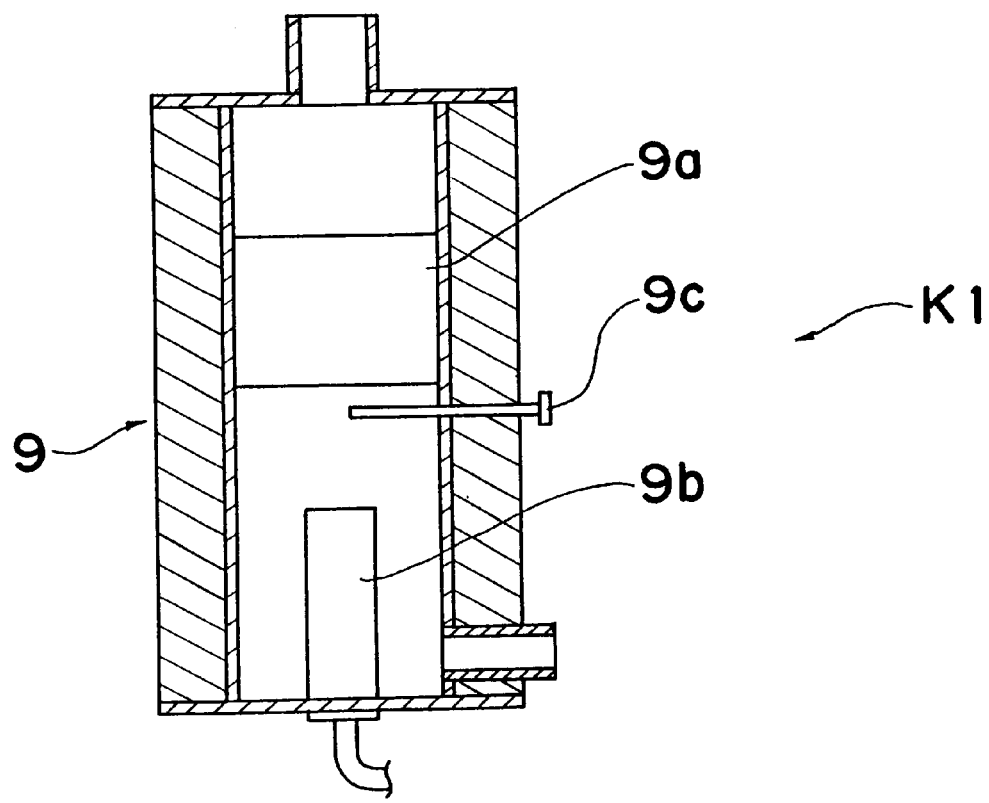
FIG. 2 is a fragmentary longitudinal sectional view of a catalytic deodorizing portion of the waste plastic disposal apparatus of FIG. 1.

As shown in FIG. 2, the catalytic deodorizing portion 9 includes a catalytic portion 9a in which platinum series oxidizing catalyst is carried by honeycomb ceramic, a heater 9b provided upstream of the catalytic portion 9a and a temperature measuring portion 9c for measuring temperature of the catalytic portion 9a.

Hereinafter, operation of the waste plastic disposal apparatus K1 of the above described arrangement is described. Initially, the lid 2b is opened and waste plastic is put into the storage container 2a so as to be placed on the bottom plate 3. Subsequently, by turning on the fan 7a and the heater 7b, hot air is blown from the hot-air inlet 7c to the waste plastic in the storage container 2a. At this time, temperature of hot air is measured by the temperature sensor 8 and is controlled so as to be not less than a glass transition temperature (plastic softening temperature) and not more than a plastic fusion temperature. As shown by the arrow A in FIG. 1, hot air blown from the hot-air inlet 7c into the storage container 2a proceeds into the heat insulating vessel 6 from hot-air outlets 15 provided on the storage container 2a and then, is sucked to the suction port 7d by the fan 7a so as to be circulated. At this time, external air is drawn from the external air intake 11 having negative pressure due to wind pressure of the fan 7a and ventilates the hot-air circulating path 20.

Meanwhile, by utilizing pressure of the fan 7a, hot air in the waste plastic disposal apparatus K1 is carried, in a quantity corresponding to an intake quantity of external air, to the catalytic deodorizing portion 9 via the exhaust path 10 and then, is exhausted. At this time, the catalytic portion 9a is arranged to be heated by the heater 9b to a preset temperature of the temperature measuring portion 9c. Finally, after the waste plastic has been heated, the bag 4 is expanded by feeding air into the bag 4 by the air pump 5 so as to lift the bottom plate 3. As a result, the waste plastic is compressed between the bottom plate 3 and the lid 2b so as to be subjected to plastic deformation.

The waste plastic disposal apparatus K1 aims chiefly to reduce volume of general-purpose waste plastic by heating and compressing it. To this end, when waste plastic is heated, temperature of hot air is controlled, while being detected by the temperature sensor 8, so as to range from a lower limit set at the glass transition temperature at which elasticity of plastic drops sharply to an upper limit set at the plastic fusion temperature for restraining fusion of plastic. Thus, it is possible to compress the waste plastic by small stress. However, plastic may emit malodorous gas during its heating according to kinds of plastic, thereby resulting in possible exhalation of malodor from the waste plastic disposal apparatus K1. Therefore, in this embodiment, not only external air in a volume not less than 20% of a volume of the hot-air circulating path 20 is carried into the hot-air circulating path 20 per minute but hot air in a volume equal to the above mentioned volume of external air is deodorized through oxidative destruction by the catalytic deodorizing portion 9 so as to be exhausted such that the waste plastic disposal apparatus K1 is ventilated. As a result, quantity of gas produced during heating of waste plastic can be reduced effectively.

Meanwhile, in this embodiment, on the basis of plastic which produces a large quantity of gas, 20% of the volume of the hot-air circulating path 20 is set at a minimum ventilation quantity of external air carried into the hot-air circulating path 20 per minute. It is needless to say that effectiveness of reducing produced gas is enhanced in proportion to ventilation quantity. In case only plastic which produces less gas is disposed of, ventilation quantity is not required to be large but may be determined in view of capacity and economic aspect of the catalytic deodorizing portion 9. Meanwhile, in this embodiment, the fan 7a of the heating portion 7 is used for intake of external air into the hot-air circulating path 20 and feed of hot air to the catalytic deodorizing portion 9. However, two fans therefor may also be provided separately. Furthermore, pneumatic pressure is used for a compressive mechanism for compressing waste plastic but similar compressive effect can be gained by any compressive mechanism for applying stress to waste plastic, for example, a rack-and-pinion mechanism, a mechanism for applying load from above, etc. Meanwhile, plastic having large thermal shrinkage, for example, foamed polystyrene can be considerably reduced in volume only by providing a heating mechanism without providing the compressive mechanism referred to above.

Hereinafter, a first example of the first embodiment is described in which foamed polystyrene exhaling malodor at the time of its heating is disposed of as waste plastic by the waste plastic disposal apparatus K1. When heated, foamed polystyrene emits a large quantity of malodorous gases such as styrene acting as residual monomer, toluene acting as foaming auxiliary, etc. Furthermore, at this time, a large quantity of such residual components of foaming agent as butane, pentane, cyclohexane, etc. are also produced. The quantity of gas produced from foamed polystyrene is apt to be larger as the time period after foaming is shorter. Immediately after foaming of a foamed polystyrene, foaming agent resides in a quantity of 2 to 3% by weight of foamed polystyrene. Therefore, if a large quantity of foamed polystyrene is heated without ventilation immediately after foaming, concentration of gas produced in the storage container 2a may fall within its combustible range. Therefore, also from a standpoint of safety, ventilation quantity of the waste plastic disposal apparatus K1 should be set to a large value. Thus, in this example, ventilation quantity is set at 60 l/min. on the basis of a volume of about 150 l of the hot-air circulating path 20 and a disposal capacity of about 600 g/operating cycle for foamed polystyrene by the waste plastic disposal apparatus K1. Meanwhile, generally, quantity of produced gas is inclined to increase in proportion to heating temperature. Therefore, in order to prevent sudden production of gas from foamed polystyrene by distributing temperature of foamed polystyrene, heating conditions in which the temperature of hot air is raised gently from 110° C. to 130° C. and finally reaches 150° C. at the hot-air inlet 7c are employed. As a result, at the ventilation quantity of 60 l/min., production of malodor can be prevented and gas produced by heating foamed polystyrene can be reduced to a safe concentration. Meanwhile, in this example, it was confirmed that when a ventilation quantity of 30 l (corresponding to 20% of the volume of the hot-air circulating path 20)/min. or more is employed, gas produced by heating foamed polystyrene can be reduced to a safe concentration. At this time, ventilation quantity was adjusted by changing area of the external air intake 11. Meanwhile, by heating foamed polystyrene by hot air of 150° C., its volume is reduced to about 1/30 of its original volume.

Then, a second example of the first embodiment is described in which PET bottles emitting less gas are disposed of as waste plastic by the waste plastic disposal apparatus K1. Gas is scarcely produced from PET bottles. However, by heating PET bottles, malodor is exhaled from residues of the PET bottles. However, in this example, it was confirmed that when not only external air in a volume not less than 20% of the volume of the hot-air circulating path 20 is carried into the hot-air circulating path 20 per minute but hot air in a volume equal to the above mentioned volume of external air is deodorized through oxidative destruction by the catalytic deodorizing portion 9 so as to be exhausted, produced malodor is destroyed substantially. Meanwhile, by heating and compressing the PET bottles simultaneously, its volume is reduced to about 1/12 of its original volume.

Hereinafter, a third example of the first embodiment is described in which volume of waste plastic is reduced by setting cross-sectional area of the exhaust path 10 so as to set flow velocity of exhaust of hot air at not less than 1 m/sec. on the basis of exhaust quantity of hot air from the hot-air circulating path 20. In this concrete example, heating control is performed such that an upstream face of the catalytic portion 9a usually assumes 500° C. As a result, if volatile combustible components penetrate into the catalytic deodorizing portion 9 or a large quantity of combustible gas is produced from waste plastic, such a risk may arise that the catalytic deodorizing portion 9 acts as an ignition source for igniting such gases. Meanwhile, generally, maximum combustion speed of combustible hydrocarbon components at ordinary temperature is less than 1 m/sec. Therefore, in this example, in order to avoid the above mentioned risk, the cross-sectional area of the exhaust path 10 is set so as to set flow velocity of exhaust of hot air at not less than 1 m/sec. on the basis of exhaust quantity of hot air delivered to the catalytic deodorizing portion 9. By setting the flow velocity of exhaust of hot air delivered to the catalytic deodorizing portion 9 at not less than 1 m/sec. ignition of gas in the waste plastic disposal apparatus K1 by the catalytic deodorizing portion 9 can be prevented also theoretically.

Then, tests were made in order to investigate whether or not back fire occurs due to the catalytic deodorizing portion 9 acting as an ignition source. In the tests, butane gas and styrene gas which are produced by heating foamed polystyrene are put in the waste plastic disposal apparatus K1 at an approximately identical concentration and then, it is examined whether or not these gases are ignited by the catalytic deodorizing portion 9. The tests have revealed that when flow velocity of exhaust of hot air is not less than 1 m/sec., back fire of butane gas and styrene gas from the catalytic deodorizing portion 9 does not occur.

(Second embodiment)

Figure 3:
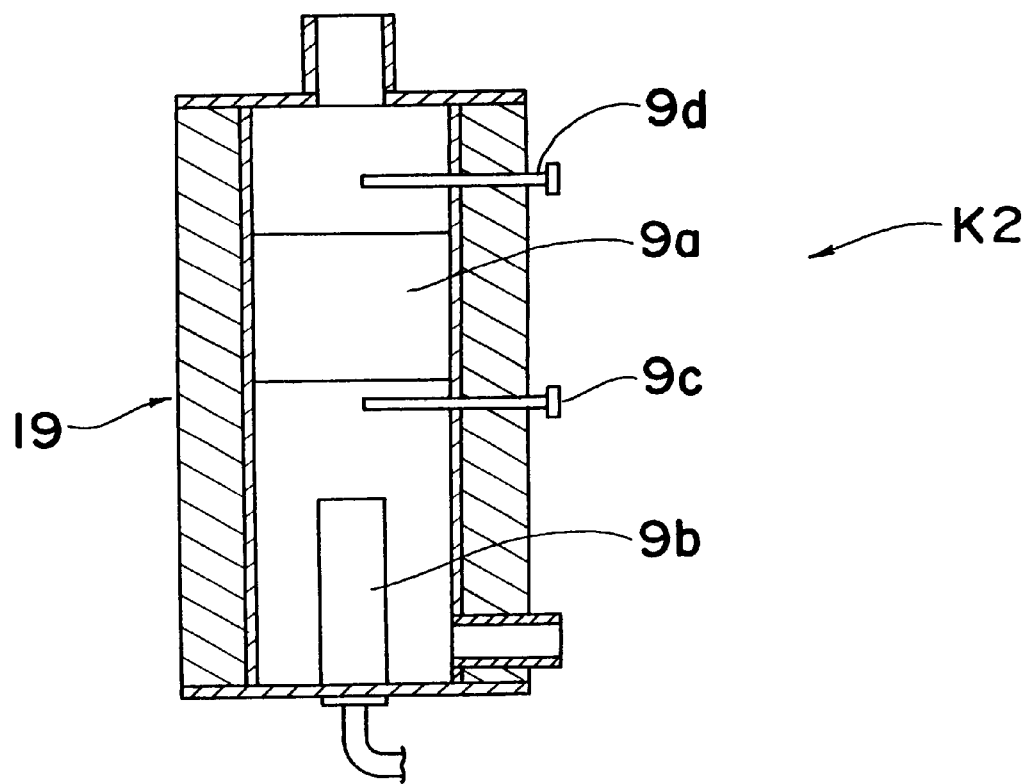
FIG. 3 is a fragmentary longitudinal sectional view of a catalytic deodorizing portion of a waste plastic disposal apparatus according to a second embodiment of the present invention.

FIG. 3 shows a catalytic deodorizing portion 19 of a waste plastic disposal apparatus K2 according to a second embodiment of the present invention. The catalytic deodorizing portion 19 is structurally similar to the catalytic deodorizing portion 9 of the waste plastic disposal apparatus K1 except that a temperature measuring portion 9d for measuring temperature of exhaust air is provided at an exhaust port. Since other constructions of the waste plastic disposal apparatus K2 are similar to those of the waste plastic disposal apparatus K1, the description is abbreviated for the sake of brevity.

In the waste plastic disposal apparatus K2 of the above described arrangement, the catalytic portion 9a is preheated to a preset temperature prior to the start of heating of waste plastic and the temperature of exhaust air is measured by the temperature measuring portion 9d during preheating of the catalytic portion 9a such that disposal of waste plastic is controlled on the basis of the temperature of exhaust air.

In order to reduce quantity of gas produced by heating waste plastic in the waste plastic disposal apparatus K2, a ventilation arrangement similar to that of the waste plastic disposal apparatus K1 is employed in which external air is carried into the waste plastic disposal apparatus K2 and hot air in the waste plastic disposal apparatus K2 is exhausted through the catalytic deodorizing portion 19. Ventilation quantity and quantity of reduction of produced gas have correlation. Thus, in order to sufficiently reduce the quantity of produced gas, it is necessary to secure a predetermined ventilation quantity. However, if the capacity of the fan 7a drops or clogging of the exhaust path 10 occurs, ventilation quantity may decrease. Therefore, in this embodiment, ventilation quantity to the catalytic deodorizing portion 19 is estimated from temperature measured by the temperature measuring portion 9d at the time temperature measured by the temperature measuring portion 9c has reached a preset value during preheating of the catalytic portion 9a for the following reason. Namely, ventilation quantity and quantity of heat carried from an upstream side to a downstream side of the catalytic portion 9a per unit time are correlated to each other. Therefore, ventilation quantity of hot air to the catalytic deodorizing portion 19 can be estimated from temperature measured by the temperature measuring portion 9d at the time temperature measured by the temperature measuring portion 9c has reached the preset value during preheating of the catalytic portion 9a. By performing disposal after it has been confirmed by these operations that not less than the predetermined ventilation quantity is obtained, malodor can be reduced positively.

Hereinafter, a first example of the second embodiment is described in which ventilation quantity of hot air to the catalytic deodorizing portion 19 is estimated by using the waste plastic disposal apparatus K2. In this concrete example, exhaust temperature of hot air is measured when ventilation flow rate of hot air to the catalytic deodorizing portion 19 is set at 0, 30, 45 and 60 l/min. and the catalytic portion 9a is preheated such that temperature measured by the temperature measuring portion 9c assumes 400° C. Meanwhile, temperature of external air is 20° C. When ventilation flow rate is 0, 30, 45, 60 l/min., the exhaust temperature of hot air at the time temperature measured by the temperature measuring portion 9c has reached 400° C. assumes 21, 65, 167 and 273° C., respectively. Thus, it was found that exhaust temperature rises in response to increase of ventilation flow rate. In order to set minimum exhaust quantity at not less than 30 l/min. based on these measurement results in this example, temperature measured by the temperature measuring portion 9d at the time temperature measured by the temperature measuring portion 9c has reached the preset value is set at 100° C.

Meanwhile, by detecting ventilation flow rate at the time of start of disposal of waste plastic, it is possible to detect clogging of the exhaust path 10 or failure of the fan 7a. Meanwhile, if control in which transfer to a heating process of waste plastic does not take place is performed in case exhaust flow rate is small, production of a large quantity of gas can be prevented preliminarily when foamed polystyrene leading to production of a large quantity of gas is disposed of. Furthermore, even if volatile combustible components such as kerosine are erroneously introduced into the waste plastic disposal apparatus K2, disposal can be prevented in advance and thus, there is no risk that the combustible components in the waste plastic disposal apparatus K2 are ignited during a preheating process. At this time, since volatilized combustible components are delivered to the catalytic deodorizing portion 19 together with hot air and are oxidized by the catalytic deodorizing portion 19 so as to produce heat, exhaust temperature at the time of preheating exhibits a value higher than that at the time of proper preheating. Therefore, by setting an upper limit of exhaust temperature, it is possible to detect penetration of combustible components into the waste plastic disposal apparatus K2. Meanwhile, exhaust temperature during preheating varies according to size of the waste plastic disposal apparatus K2, disposal conditions, etc. and therefore, should be, needless to say, set in accordance with these factors.

Meanwhile, plastic may exhale malodor from its heating temperature according to its kinds. Therefore, in case heating of the catalytic portion 9a is started concurrently with heating of waste plastic in the waste plastic disposal apparatus K2, there is a possibility that malodor leaks because the catalytic portion 9a is not heated sufficiently. In order to cause the catalytic deodorizing portion 19 employing platinum series oxidizing catalyst to function effectively, the catalytic portion 9a should be heated to its activation. Thus, in this embodiment, activity of the catalyst is promoted by preheating the catalytic portion 9a so as to deal with also malodor produced at an initial stage of heating of waste plastic. Hereinafter, a second example of the second embodiment is described in which foamed polystyrene is disposed of, as plastic exhaling malodor at low temperatures, by using the waste plastic disposal apparatus K2. Foamed polystyrene emits styrene when heated to a temperature of about 80° C. Therefore, in case disposal is started without preheating the catalytic portion 9a, malodor of styrene can be considerably perceived from the catalytic deodorizing portion 19 at an initial stage of heating of foamed polystyrene. However, it was confirmed that when heating of foamed polystyrene is started after the catalytic portion 9a has been preheated to 400° C., malodor of styrene is scarcely perceived from the catalytic deodorizing portion 19 at an initial stage of heating of foamed polystyrene. Meanwhile, in this example, the catalytic portion 9a is preheated to 400° C. at which styrene can react fully. However, it is desirable that this preheating condition should be set in consideration of the kinds of plastic to be heated, produced gas and its catalytic reactivity.

In the second embodiment, upper limits may be, respectively, allotted to temperature measured by the temperature measuring portion 9c and temperature measured by the temperature measuring portion 9d such that heating of the catalytic portion 9a and waste plastic is controlled when temperature measured by the temperature measuring portion 9c and temperature measured by the temperature measuring portion 9d exceed the respective upper limits. In case foamed polystyrene producing a large quantity of gas is disposed of by the waste plastic disposal apparatus K2, a large quantity of styrene acting as residual monomer, malodorous gas such as toluene acting as foaming auxiliary and residual components of foaming agent such as butane, pentane, cyclohexane, etc. are produced as described in the first embodiment. If these components are delivered to the catalytic deodorizing portion 19 at high concentrations, quantity of heat produced at the catalytic portion 9a increases and thus, temperature of the catalytic portion 9a may exceed its heat-resistant temperature. Therefore, the upper limit is allotted to temperature measured by the temperature measuring portion 9c. If temperature measured by the temperature measuring portion 9c exceeds the upper limit, electric power inputted to the heater 9b for heating the catalytic portion 9a is reduced such that excessive heating of the catalytic portion 9a by the heater 9b is prevented. Furthermore, in order to reduce the quantity of gas produced from foamed polystyrene, control for reducing electric power inputted to the heater 7b for heating waste plastic is performed.

Meanwhile, since foaming agent contained in foamed styrene varies according to use applications and makers, the composition of produced gases is not fixed. For example, if much butane gas having catalytic reactivity inferior to that of other gases is present, much reaction of butane gas takes place at a downstream side of the catalytic portion 9a and thus, temperature measured by the temperature measuring portion 9c disposed upstream of the catalytic portion 9a does not rise so much. As a result, if the heater 9b for heating the catalytic portion 9a is controlled only by the temperature measuring portion 9c, temperature downstream of the catalytic portion 9a may exceed the heat-resistant temperature of the catalytic portion 9a. Hence, also in the case where temperature measured by the temperature measuring portion 9d disposed downstream of the catalytic portion 9a, exceeds the upper limit, control for reducing electric power inputted to the heater 9b for heating the catalytic portion 9a and the heater 7b for heating waste plastic is performed. By using these controls by the temperature measuring portions 9c and 9d in combination, not only excessive heating of the catalytic portion 9a can be prevented but quantity of gas produced from waste plastic can be reduced.

Hereinafter, a third example of the second embodiment is described in which heating of the catalytic portion and foamed polystyrene is controlled on the basis of the upper limit of temperature measured by the temperature measuring portion 9c and the upper limit of temperature measured by the temperature measuring portion 9d as described above. In this example, an upper limit of 500° C. and an upper limit of 600° C. are, respectively, allotted for temperature measured by the temperature measuring portion 9c and temperature measured by the temperature measuring portion 9d and control for reducing electric power inputted to the heater 9b for heating the catalytic portion 9a and the heater 7b for heating waste plastic is performed on the basis of these upper limits. When a large quantity of gas has been produced from foamed polystyrene, temperature measured by the temperature measuring portion 9c and temperature measured by the temperature measuring portion 9d exceed the respective upper limits. However, at this time, since electric power inputted to the heater 7b is reduced, heating of foamed polystyrene is controlled such that quantity of gas produced from foamed polystyrene is reduced. It was confirmed that by simultaneously lowering electric power inputted to the heater 9b, excessive heating of the catalytic portion 9a can be prevented.

Meanwhile, in the above example, the upper limits are, respectively, allotted for temperature measured by the temperature measuring portion 9c and temperature measured by the temperature measuring portion 9d. However, an upper limit may also be allotted for only one of temperature measured by the temperature measuring portion 9c and temperature measured by the temperature measuring portion 9d in the case of disposal of waste plastic producing a small quantity of gas and in accordance with purpose of disposal such that heating of the catalytic portion 9a and waste plastic is controlled. Namely, in case an upper limit is allotted for only temperature measured by the temperature measuring portion 9c, control for lowering electric power inputted to the heaters 9b and 7b is performed when temperature measured by the temperature measuring portion 9c exceeds the upper limit. Likewise, in case an upper limit is allotted for only temperature measured by the temperature measuring portion 9d, control for lowering electric power inputted to the heaters 9b and 7b is performed when temperature measured by the temperature measuring portion 9d exceeds the upper limit.

Furthermore, in the case where a large quantity of combustible gas has been produced due to excessive heating of waste plastic or erroneous introduction of combustible components into the waste plastic disposal apparatus K2, heat resistance of the catalytic portion 9a may present a problem and combustible components may reach a concentration sufficient for ignition. Therefore, in the third example of the second embodiment, a maximum upper limit of 800° C. may be allotted for both temperature measured by the temperature measuring portion 9c and temperature measured by the temperature measuring portion 9d. At this time, in case temperature measured by the temperature measuring portion 9c has exceeded the upper limit of 500° C. and in case temperature measured by the temperature measuring portion 9d has exceeded the upper limit of 600° C., control for lowering electric power inputted to the heaters 9b and 7b is performed. On the other hand, in the case where temperature measured by the temperature measuring portion 9c has exceeded the maximum upper limit of 800° C. and in the case where temperature measured by the temperature measuring portion 9d has exceeded the maximum upper limit of 800° C., heating of the catalytic portion 9a and waste plastic is stopped. Under this control, if volatile combustible components penetrate into the waste plastic disposal apparatus K2, temperature measured by the temperature measuring portion 9c and temperature measured by the temperature measuring portion 9d exceed the maximum upper limit of 800° C., so that heating of the catalytic portion 9a and waste plastic is stopped and thus, disposal of waste plastic can be stopped positively. Namely, by performing control for stopping disposal of waste plastic in the case where at least on of the temperatures measured by the temperature measuring portion 9c and the temperature measuring portion 9d has exceeded the maximum upper limit of 800° C., such effects can be gained in that the risk of ignition of produced gas upon entry of foreign matter is lessened and excessive heating of the catalytic portion 9a is prevented.

Meanwhile, in the above example, the upper limit and the maximum upper limit are allotted for each of the temperatures measured by the temperature measuring portion 9c and the temperature measuring portion 9d. However, the upper limit and the maximum upper limit may also be allotted for only one of the temperature measuring portion 9c and the temperature measuring portion 9d in the case of disposal of waste plastic producing a small quantity of gas and in accordance with purpose of disposal such that heating of the catalytic portion 9a and waste plastic is controlled. Namely, in the case where the upper limit and the maximum upper limit are allotted for only temperature measured by the temperature measuring portion 9c, control for lowering electric power inputted to the heaters 9b and 7b is performed when temperature measured by the temperature measuring portion 9c has exceeded the upper limit. On the other hand, when temperature measured by the temperature measuring portion 9c has exceeded the maximum upper limit, heating of the catalytic portion 9a and waste plastic is stopped. similarly, in case the upper limit and the maximum upper limit are allotted for only temperature measured by the temperature measuring portion 9d, control for lowering electric power inputted to the heaters 9b and 7b is performed when the temperature measured by the temperature measuring portion 9d has exceeded the upper limit. On the other hand, when temperature measured by the temperature measuring portion 9d has exceeded the maximum upper limit, heating of the catalytic portion 9a and waste plastic is stopped. It is desirable that the maximum upper limit is set in accordance with heat-resistant temperature of catalyst and ignition temperature of produced gas.

(Third embodiment)

Figure 4:
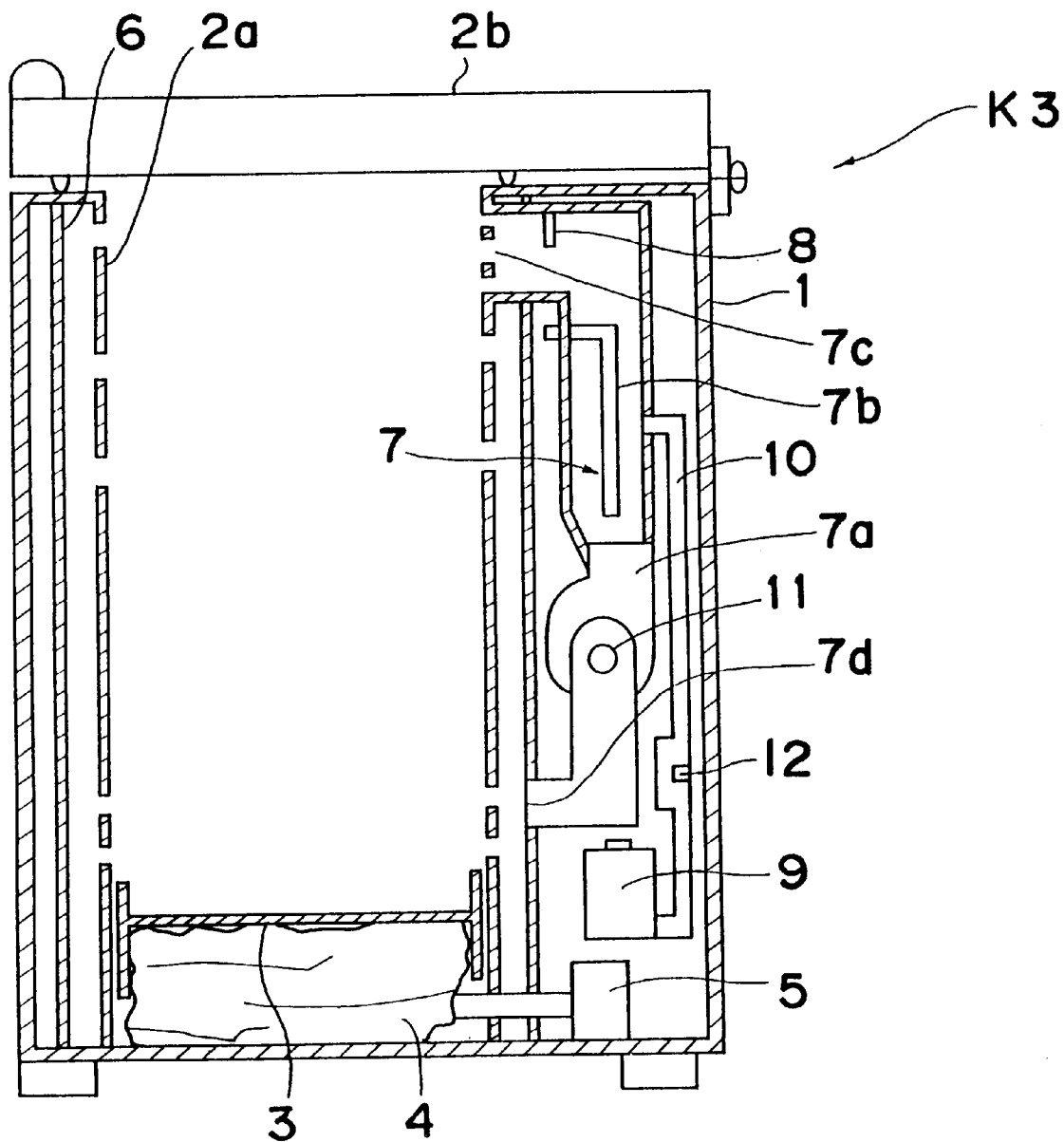
FIG. 4 is a fragmentary longitudinal sectional view of a waste plastic disposal apparatus according to a third embodiment of the present invention.

FIG. 4 shows a waste plastic disposal apparatus K3 according to a third embodiment of the present invention. In the waste plastic disposal apparatus K3, a temperature sensor 12 is provided in the exhaust path 10 leading to the catalytic deodorizing portion 9. Since other constructions of the waste plastic disposal apparatus K3 are similar to those of the waste plastic disposal apparatus K1, the description is abbreviated for the sake of brevity.

The waste plastic disposal apparatus K3 is operated in the same manner as the waste plastic disposal apparatus K1 except that temperature of hot air in the exhaust path 10 is measured by the temperature sensor 12 during disposal of waste plastic and exhaust flow rate of hot air is detected on the basis of changes of temperature of hot air such that disposal of waste plastic is controlled.

In order to reduce quantity of gas produced by heating waste plastic in the waste plastic disposal apparatus K3, a ventilation arrangement similar to that of the waste plastic disposal apparatus K1 is employed in which external air is carried into the waste plastic disposal apparatus K3 and hot air in the waste plastic disposal apparatus K3 is exhausted through the catalytic deodorizing portion 19. To this end, it is desirable that not less than a predetermined ventilation quantity is secured during disposal of waste plastic. In the waste plastic disposal apparatus K2, it is possible to detect ventilation quantity at an initial stage of disposal of waste plastic but it is difficult to detect ventilation quantity during disposal of waste plastic.

Therefore, in this embodiment, by measuring changes of temperature of hot air in the exhaust path 10 by the temperature sensor 12, ventilation quantity during disposal of waste plastic is detected. Usually, since hot air in a predetermined quantity corresponding to ventilation quantity is delivered to the catalytic deodorizing portion 9, temperature of hot air in the exhaust path is substantially fixed. On the other hand, in a case where the ventilation quantity drops due to clogging of the external air intake 11 of the fan 7a, etc., quantity of heat carried per unit time by hot air decreases but heat dissipation in the exhaust path 10 does not diminish so much, so that temperature of hot air in the exhaust path 10 drops. Therefore, by detecting changes of temperature of hot air in the exhaust path 10 by the temperature sensor 12 provided in the exhaust path 10, it is possible to judge a drop in the state of exhaust flow rate of hot air. Consequently, it is possible to detect ventilation quantity during disposal of waste plastic.

Hereinafter, one example of the third embodiment is described in which ventilation quantity is detected from changes of temperature of hot air in the exhaust path 10 by using the waste plastic disposal apparatus K3. In this example, temperature of external air is 20° C., exhaust flow rate of hot air to the catalytic deodorizing portion 9 is set at 0, 30 and 60 l/min. and temperature of hot air in the hot-air circulating path 20 is set at 130° C. At this time, when exhaust flow rate of hot air to the catalytic deodorizing portion 9 is set at 0, 30 and 60 l/min., temperature of hot air in the exhaust path 10, which is measured by the temperature sensor 12, assumes 40, 80 and 120° C., respectively. Thus, temperature of hot air in the exhaust path 10 drops in response to reduction of exhaust flow rate of hot air. Therefore, by measuring changes of temperature of hot air to the catalytic deodorizing portion 9 during disposal of waste plastic, it is possible to detect exhaust flow rate of hot air. Based on this, the exhaust flow rate of 30 l/min. is set as a minimum ventilation quantity. Thus, in the case where temperature of hot air in the exhaust path 10, which is measured by the temperature sensor 12, has dropped to not more than 80° C., control is performed such that disposal of waste plastic is stopped immediately.

Meanwhile, changes of temperature of hot air in the exhaust path 10 in response to changes of ventilation quantity are greatly influenced by heat dissipation in the exhaust path 10. However, if temperature of external air is measured preliminarily prior to disposal of waste plastic and control based on the temperature is performed, it is possible to positively detect changes of ventilation quantity.

In this embodiment, the temperature sensor 12 is provided in the exhaust path 10. However, a pressure sensor may be provided in the exhaust path 10 in place of the temperature sensor 12 such that ventilation quantity is detected by measuring changes of pressure of hot air in the exhaust path 10 by the pressure sensor.

(Fourth embodiment)

Figure 5:
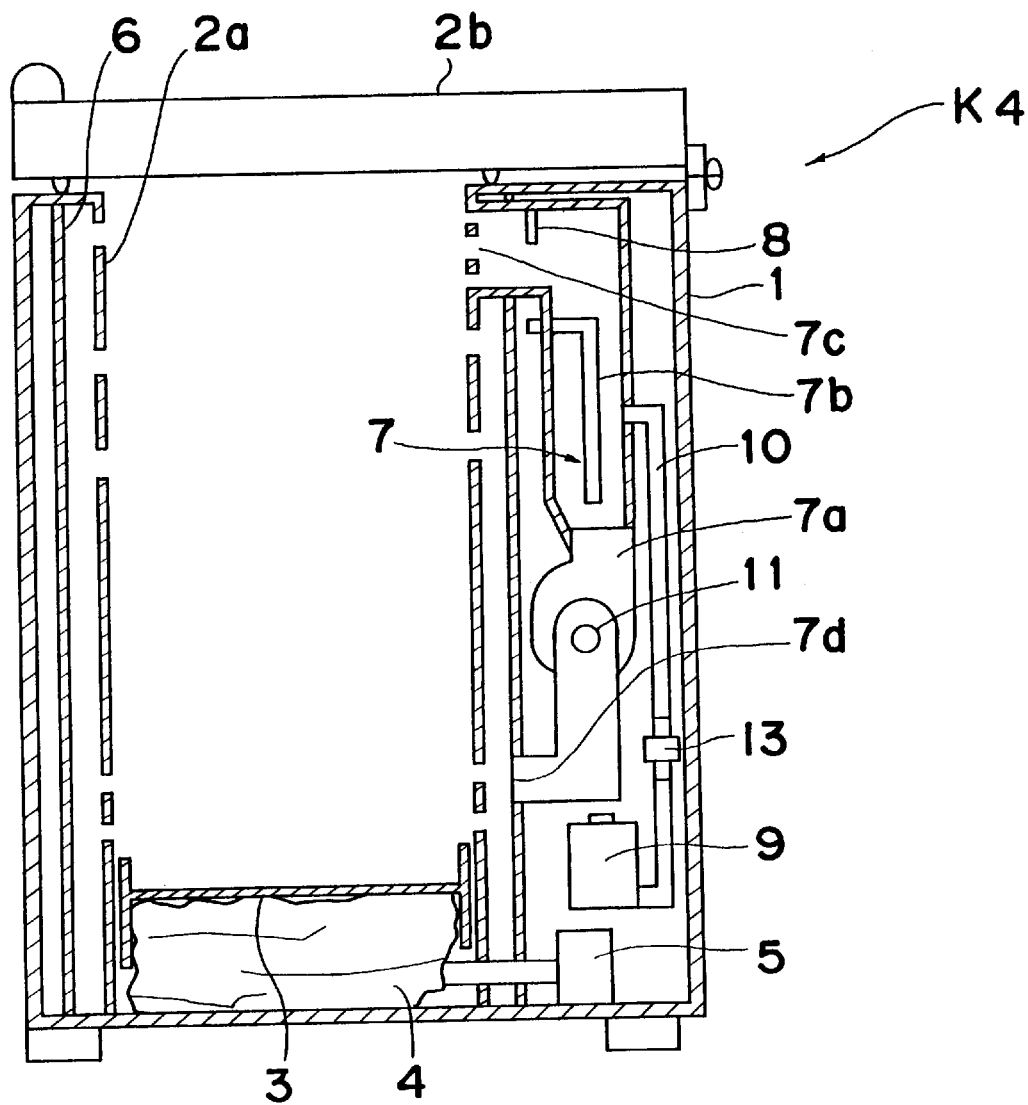
FIG. 5 is a fragmentary longitudinal sectional view of a waste plastic disposal apparatus according to a fourth embodiment of the present invention.
Figure 6:
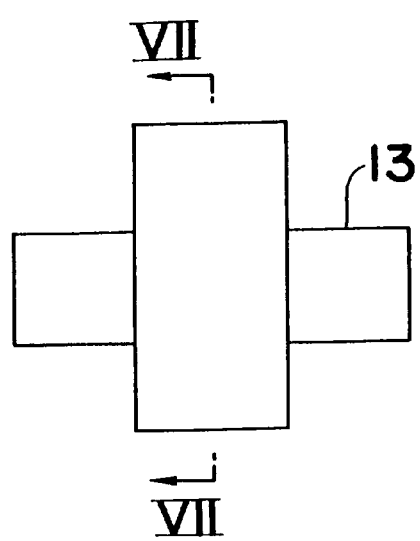
FIG. 6 is a front elevational view of an anti-flaming portion of the waste plastic disposal apparatus of FIG. 5.
Figure 7:
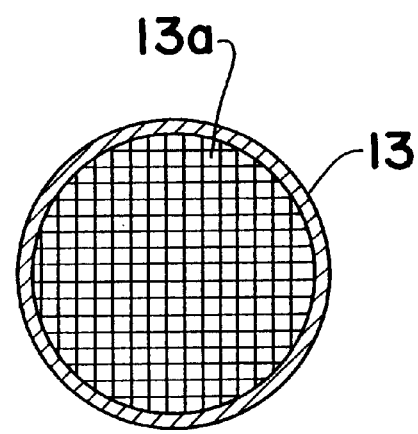
FIG. 7 is a sectional view taken along the line VII—VII in FIG. 6.

FIG. 5 shows a waste plastic disposal apparatus K4 according to a fourth embodiment of the present invention. In the waste plastic disposal apparatus K4, an anti-flaming portion 13 including a metallic gauze 13a having a mesh of not more than 1 mm is provided in the exhaust path 10 leading to the catalytic deodorizing portion 9. FIGS. 6 and 7 illustrate an arrangement of the anti-flaming portion 13 in detail. Since other constructions of the waste plastic disposal apparatus K4 are similar to those of the waste plastic disposal apparatus K1, the description is abbreviated for the sake of brevity.

In this embodiment, heating control of the catalytic deodorizing portion 9 is performed such that an upstream face of the catalytic portion 9a reaches 500° C. Therefore, in case volatile combustible components penetrate into the catalytic deodorizing portion 9 or a large quantity of combustible gas components are produced from waste plastic, there is a risk that the catalytic deodorizing portion 9 will act as an ignition source for igniting such gases. As described in the first embodiment, such risk can be obviated by setting the exhaust flow rate of hot air in the exhaust path 10 at not less than 1 m/sec. However, exhaust flow rate of hot air may become less than 1 m/sec. due to failure of the fan 7a, etc. On the other hand, the minimum energy required for igniting combustible gaseous mixture depends on the geometrical shape of a heat source. Thus, by providing a gap for disabling propagation of this energy, i.e., an anti-flaming distance, spreading of fire can be prevented. Therefore, in this embodiment, since the anti-flaming portion 13 having the metallic gauze 13a is provided in the course of the exhaust path 10 leading to the catalytic deodorizing portion 9, spreading of fire from the catalytic deodorizing portion 9 is prevented.

Meanwhile, in the waste plastic disposal apparatus K4, since flammable combustible components cannot be specified, an anti-flaming distance is roughly calculated on the basis of a minimum ignition energy of butane gas produced in the largest quantity from foamed polystyrene and the metallic gauze 13a having a mesh of not more than 1 mm is employed from this anti-flaming distance. However, it can be easily imagined that when the anti-flaming distance is roughly calculated from this minimum ignition energy, spreading of fire can be fully prevented also for other combustible components by the anti-flaming distance.

Hereinafter, one example of the fourth embodiment is described in which anti-flaming effects of the anti-flaming portion 13 are investigated in the waste plastic disposal apparatus K4. In this example, isobutane gas acting as foaming agent of foamed polystyrene is employed as combustible gas. When isobutane gas fed from an upstream side of the anti-flaming portion 13 is ignited at a downstream side of the anti-flaming portion 13, it is examined whether or not back flow of fire to the upstream side of the anti-flaming portion 13 happens by changing mesh of the metallic gauze 13a. At this time, isobutane gas falls within its combustible range and exhaust flow velocity of hot air in the exhaust path 10 is set to be not more than a value corresponding to an exhaust flow rate of 60 l/min. As a result, it was found that no fire spreads to the upstream side of the anti-flaming portion 13 including the metallic gauze 13a having a mesh of not more than 1 mm. Furthermore, even if the hot-air circulating path 20 is set to a gas concentration leading to ignition in the catalytic deodorizing portion 9, no fire spreads across the anti-flaming portion 13.

Meanwhile, in this embodiment, the metallic gauze 13a having a mesh of not less than 1 mm is employed in the anti-flaming portion 13. However, also when any incombustible member formed with pores having a mesh of not more than 1 mm is employed in place of the metallic gauze 13a, the same anti-flaming effects as the metallic gauze 13a can be achieved.

As will be clear from the foregoing description, in the waste plastic disposal apparatus of the present invention, by heating waste plastic to not less than the glass transition temperature so as to lower the mechanical strength and then, compressing the waste plastic, the volume of the waste plastic is reduced effectively. Meanwhile, during disposal of waste plastic, in response to intake per minute of external air in a volume not less than 20% of a volume of the hot-air circulating path into the hot-air circulating path defined by the storage portion and the heating portion, hot air in a volume equal to the above mentioned volume of external air is exhausted from the hot-air circulating path through the deodorizing portion such that the waste plastic disposal apparatus is ventilated. As a result, quantity of gas produced by heating waste plastic is reduced effectively.

Meanwhile, in the case where the catalytic deodorizing portion mainly consisting of oxidizing catalyst is used as the deodorizing portion, ventilation quantity can be estimated by measuring changes of temperature of exhaust of hot air from the catalytic deodorizing portion in the process for preheating the catalytic deodorizing portion to the preset temperature or by measuring changes of temperature of pressure of hot air in the exhaust path during heating of waste plastic. Meanwhile, by controlling heating of the catalyst and waste plastic on the basis of measurement results of temperature of exhaust air during disposal of waste plastic, excessive production of gas at the time of heating of waste plastic and excessive heating of the catalyst can be prevented.

Furthermore, when exhaust flow velocity of hot air in the exhaust path leading to the deodorizing portion is set to be not less than 1 m/sec. or the anti-flaming portion including the metallic gauze having a mesh of not more than 1 mm is provided in the exhaust path, spreading of fire from the catalytic deodorizing portion to combustible components is prevented.

By disposal of waste plastic as described above, since volume of waste plastic is reduced safely and effectively at small-scale firms, etc. where waste plastic is produced, efficiency for recovering waste plastic can be raised and recycling of waste plastic can be performed economically.

We claim:

1. A waste plastic disposal apparatus comprising:
   a storage portion for storing waste plastic, said storage portion including a lid;
   a heating assembly for heating the waste plastic in said storage portion, said heating assembly including a first heater and a fan,
   wherein said storage portion and said heating assembly define a hot-air circulating path for circulating hot air;
   an exhaust conduit communicating with the hot-air circulating path;
   a deodorizing device connected to said exhaust conduit for deodorizing gases exhausted through said exhaust conduit, said deodorizing device comprising a catalytic portion, a second heater for heating said catalytic portion, and a first temperature measuring device, disposed downstream of said second heater, for measuring the temperature of said catalytic portion,
   wherein said first temperature measuring device is operable to determine when the temperature of said catalytic portion exceeds a first predetermined upper limit temperature of said catalytic portion;
   a power supply connected to said first and second heaters, wherein the power supplied to said first and second heater is reduced when the first temperature measuring device measures a temperature of the catalytic portion, which exceeds a first predetermined upper temperature limit; and
   an external air intake communicating with said fan, wherein, in response to intake of a predetermined quantity of external air into the hot-air circulating path per unit time, a portion of the hot air in the hot-air circulating path is exhausted through said exhaust conduit and said deodorizing device in a quantity which is equal to the predetermined quantity of external air.

2. A waste plastic disposal apparatus as claimed in claim 1, wherein said catalytic portion includes an oxidizing catalyst.

3. A waste plastic disposal apparatus as claimed in claim 1, wherein said fan of said heating assembly is operable to create a negative pressure such that external air is sucked into the hot-air circulating path.

4. A waste plastic disposal apparatus as claimed in claim 3, wherein the air sucked into the hot-air circulating path is at least 20% of the volume of the hot-air circulating path.

5. A waste plastic disposal apparatus as claimed in claim 1, wherein:
   said first temperature measuring device is operable to measure a second predetermined upper temperature limit which is higher than the first predetermined upper temperature limit,
   said supply of power to said first and second heaters is reduced when said first temperature measuring device measures a temperature between the first and second predetermined upper limits, and
   said supply of power to said first and second heaters is cutoff when said first temperature measuring device measures a temperature in excess of the second predetermined upper temperature limit.

6. A waste plastic disposal apparatus as claimed in claim 1, wherein said deodorizing device further comprises a second temperature measuring device for measuring the temperature of the exhaust gas, said second temperature measuring device being disposed downstream of said catalytic portion.

7. A waste plastic disposal apparatus as claimed in claim 1, wherein a cross-sectional flow area of said exhaust conduit is selected such that a flow velocity of the hot air exhausted through said exhaust conduit is greater than or equal to 1 m/sec.

8. A waste plastic disposal apparatus as claimed in claim 1, further comprising a temperature sensor disposed in said exhaust conduit for measuring the temperature of the hot-air in said exhaust conduit, wherein a flow rate of hot-air through said exhaust conduit can be estimated from changes of the temperature of the hot-air measured by the temperature sensor prior to and during disposal of the waste plastic, and, when the estimated flow rate of the hot-air has drops to less than or equal to a preset value, heating of the waste plastic is terminated.

9. A waste plastic disposal apparatus as claimed in claim 1, further comprising a pressure sensor disposed in said exhaust conduit for measuring pressure in said exhaust conduit, wherein a flow rate of hot-air in said exhaust conduit can be estimated from pressure changes of the hot air measured by the pressure sensor prior to and during disposal of the waste plastic, and, when the estimated flow rate of the hot air drops to less than or equal to a preset value, heating of the waste plastic is terminated.

10. A waste plastic disposal apparatus as claimed in claim 1, further comprising an anti-flaming structure provided in said exhaust conduit upstream of said deodorizing device, said anti-flaming structure including a metallic gauze having a mesh of not more than 1 mm.

11. A waste plastic disposal apparatus as claimed in claim 1, further comprising a compressing means for compressing the waste plastic.

12. A waste plastic disposal apparatus as claimed in claim 11, wherein said compressing means comprises:
   a plate member which movable disposed in said storage portion;
   a stretchable bag provided in the vicinity of said plate member; and
   an air pump connected to said bag.

13. A method of disposing of waste plastic comprising:
   supplying waste plastic in a storage portion;
   heating the waste plastic in the storage portion by circulating hot air through a hot-air circulating path, wherein a first heater and a fan are provided in the hot-air circulating path;
   exhausting a portion of the hot air through an exhaust conduit, wherein the exhaust conduit extends between the hot-air circulating path and a catalytic deodorizing device which includes a second heater and a catalytic portion;
   detecting a temperature of the catalytic portion in the catalytic deodorizing device;
   reducing power supplied to the first heater and the catalytic deodorizing device when the detected temperature exceeds a firs predetermined temperature; and
   stopping the supply of power to the first heater and the catalytic deodorizing device when the detected temperature exceeds a second predetermined temperature, wherein the second predetermined temperature is greater than the first predetermined temperature.

14. A method of disposing of waste plastic as claimed in claim 13, further comprising developing a negative pressure with the fan such that air is sucked through an external air intake in communication with the fan such that the portion of hot air exhausted through the exhaust conduit and the catalytic deodorizing device is equal to the quantity of external air sucked into the hot-air circulating path.

15. A method of disposing of waste plastic as claimed in claim 13, further comprising detecting a temperature of the exhaust hot-air at location downstream of the catalytic portion.

16. A method of disposing of waste plastic as claimed in claim 13, further comprising:

sensing a temperature in the exhaust conduit prior to and during disposal of the waste plastic;

calculating the changes in temperature in order to estimate the rate of flow of the exhaust hot air through the exhaust conduit; and stopping heating of the waste plastic when the estimated flow rate drops below a predetermined value.

* * * * *